(12) United States Patent
Milhau et al.

(10) Patent No.: US 10,693,250 B2
(45) Date of Patent: Jun. 23, 2020

(54) HYBRID FLUID CIRCULATION AND SIGNAL TRANSMISSION DEVICE

(71) Applicant: COVAL, Montelier (FR)

(72) Inventors: Pierre Milhau, Bourg de Péage (FR); Michel Cecchin, Montelier (FR)

(73) Assignee: COVAL, Montelier (FR)

( * ) Notice: Subject to any disclaimer, the term of this patent is extended or adjusted under 35 U.S.C. 154(b) by 0 days.

(21) Appl. No.: 15/553,864

(22) PCT Filed: Feb. 26, 2016

(86) PCT No.: PCT/EP2016/054122
§ 371 (c)(1),
(2) Date: Dec. 29, 2017

(87) PCT Pub. No.: WO2016/135307
PCT Pub. Date: Sep. 1, 2016

(65) Prior Publication Data
US 2018/0159254 A1    Jun. 7, 2018

(30) Foreign Application Priority Data

Feb. 27, 2015 (FR) ..................... 15 51709

(51) Int. Cl.
*H01R 13/00* (2006.01)
*F16L 25/01* (2006.01)
(Continued)

(52) U.S. Cl.
CPC .......... *H01R 13/005* (2013.01); *F16L 11/127* (2013.01); *F16L 25/01* (2013.01);
(Continued)

(58) Field of Classification Search
CPC ....... F16L 2201/30; F16L 9/125; F16L 25/01; F16L 25/127; H01B 7/2813; H01B 7/0018; H01B 7/1805; H01R 13/005
See application file for complete search history.

(56) References Cited

U.S. PATENT DOCUMENTS 6,768,921 B2 * 7/2004 Organ ................. A61B 5/0536
                                                           600/300
8,515,687 B2 * 8/2013 Pereira ................ F16L 11/127
                                                           702/179
(Continued)

FOREIGN PATENT DOCUMENTS

EP          1513227 A1      3/2005

OTHER PUBLICATIONS

EP 1513227 A1 machine translation.*

*Primary Examiner* — Edwin A. Leon
*Assistant Examiner* — Paul D Baillargeon
(74) *Attorney, Agent, or Firm* — Muncy, Geissler, Olds & Lowe, P.C.

(57) ABSTRACT

A fluid circulation device having at least one fluid circulation tube, a first coupling sealingly coupled to a first end of the tube and a second coupling sealingly coupled to a second end of the tube in such a way as to allow the circulation of fluid between said two couplings via the tube. The device further has separate electronic elements. The tube has at least one conductor track extending along an outer surface of the tube. The track is suitable for transmitting at least one signal and arranged to engage with the abovementioned electronic elements.

26 Claims, 1 Drawing Sheet

(51) Int. Cl.
  *F16L 11/127* (2006.01)
  *G08B 7/06* (2006.01)
  *H01B 7/28* (2006.01)
  *F16L 33/22* (2006.01)
  *G01M 3/40* (2006.01)
  *H01B 7/00* (2006.01)
  *H01B 7/18* (2006.01)
  *F16L 9/12* (2006.01)

(52) U.S. Cl.
  CPC ............ *F16L 33/223* (2013.01); *G01M 3/40* (2013.01); *G08B 7/06* (2013.01); *H01B 7/0018* (2013.01); *H01B 7/1805* (2013.01); *H01B 7/2813* (2013.01); *F16L 9/125* (2013.01); *F16L 2201/30* (2013.01)

(56) References Cited

U.S. PATENT DOCUMENTS

| | | |
|---|---|---|
| 2010/0174495 A1 | 7/2010 | Pereira et al. |
| 2014/0265561 A1 | 9/2014 | Beining |

* cited by examiner

HYBRID FLUID CIRCULATION AND SIGNAL TRANSMISSION DEVICE

The invention relates to fluid circulation circuits and more particularly a fluid circulation tube provided with conductor tracks for transmitting signals between electronic means. Such signals may include data signals, power signals, bonding signals.

TECHNICAL BACKGROUND OF THE INVENTION

Fluid circulation devices using tubes for transporting fluid in many fields and for many different applications are known. Nowadays, fluid transportation circuits commonly include electronic equipment connected to an electric circuit to be powered and exchange data signals.

In order to transfer signals between the above electronic pieces of equipment, the latter generally require a wire connection, which may be bulky, or a wireless connection which, if not bulky, may cause or be subjected to interferences.

OBJECT OF THE INVENTION

The object of the invention is to provide a hybrid solution for electrically connecting electric or electronic equipment integrated in a fluid transportation circuit or positioned in the vicinity of such circuit.

SUMMARY OF THE INVENTION

For this purpose, the invention provides for a fluid circulation device comprising at least one fluid circulation tube, a first coupling sealingly coupled to a first end of the tube and a second coupling sealingly coupled to a second end of the tube in such a way as to allow the circulation of fluid between said two couplings via the tube.

According to the invention, the device further comprises at least two separate electronic means, and the tube is provided with at least one conductor track extending along an outer surface of the tube, with said track being suitable for transmitting at least one signal and arranged in such a way as to engage with the abovementioned electronic means.

Such a conductor track makes the utilization of any additional connections unnecessary since it itself electrically connects the electronic means and thus enables said means to exchange signals.

The conductor track of the tube preferably is a printed conductive ink strip or a conductive metal strip.

Still preferably, at least one of the electronic means includes one electronic card and one connector engaging with the electronic card and at least one conductor track of the fluid circulation tube in such a way as to allow the transmission of a signal between the electronic card and the conductor track via the connector.

According to a not restrictive specific embodiment, at least one of the two couplings includes primary electronic means.

A first solution then consists in attaching said electronic means outside at least one coupling and a second solution consists in placing the electronic means inside a coupling housing.

According to another not restrictive specific embodiment, at least one of the electronic means is independent of the couplings and is arranged in such a way as to be adjustable in position along the tube.

BRIEF DESCRIPTION OF THE FIGURES

The invention will be better understood upon reading the following description of a specific not restrictive embodiment of the invention.

Reference will be made to the appended drawings, among which.

DETAILED DESCRIPTION OF THE INVENTION

Figure 1:
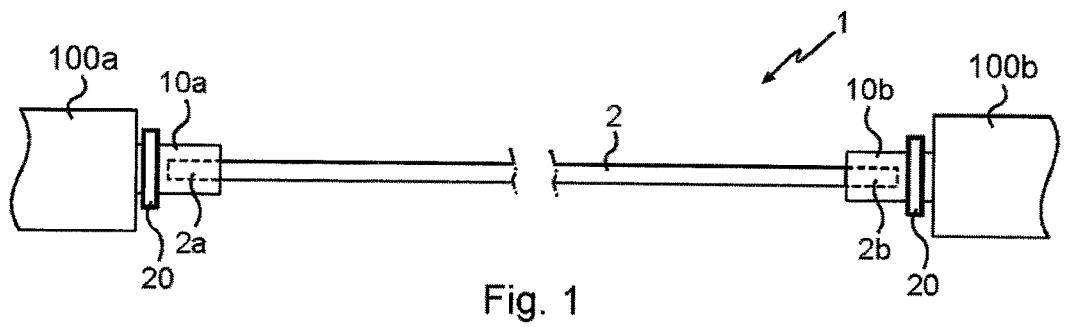
FIG. 1 is a schematic view of the fluid circulation device according to the invention, with the tube and the couplings thereof being positioned at the ends of said tube.

Referring to the appended drawings, the fluid circulation device 1 according to the invention includes a tube 2, preferably made of polyamide or polyurethane, having varying size and section. Such device is integrated in a fluid transportation circuit and can thus include several tubes and couplings associated therewith. It should be understood that, for simplicity and clarity in the description, the device is disclosed with only one tube dedicated to the transportation of air in a pneumatic circuit.

The fluid circulation device 1 further includes couplings 10a, 10b arranged in such a way as to allow a tight exchange of fluid between two units 100a, 100b of the fluid circuit, for instance pneumatic units (vacuum pumps, vent ducts, vacuum vessels, control valves, actuators, solenoid valves, sensors . . . ), via the tube 2. A first coupling 10a is thus tightly connected to a first fluid circulation unit 100a and to a first end 2a of the tube 2, and a second coupling 10b is tightly connected to a second fluid circulation unit 100b and to a second end 2b of the tube 2. Here, a coupling 10a, 10b includes:

- a jointing tip 11 suitable for entering an opening 7 at one of the ends 2a, 2b of the tube 2;
- means 12 for locking the end 2a, 2b of the tube 2 relative to the jointing tip 11, for instance a cap screwed on the tip providing tightness between the tip 11 and the tube 2; and
- a casing 13 for protecting the jointing tip 11 and the locking means 12 including a hole 13.1 arranged in such a way as to let the end 2a, 2b of the tube 2 through.

Such a device 1 thus provides tight fluid circulation between two fluid circulation units 100a, 100b via a tube 2 both ends 2a, 2b of which are connected through dedicated couplings 10a, 10b.

According to the invention, the fluid circulation device 1 is so arranged as to transmit, via the tube 2, signals between two separate electronic means 20.

As a matter of fact, the tube 2 comprises at least one conductor track 3 extending along the outer surface of the tube 2. Said track 3 is suitable for transmitting at least one electric signal. The cross-section of the track 3 and the electric conductivity of the material are determined according to the power of the electric signals to be transmitted. The track 3 is here a conductive ink strip by directly printing on the outer surface of the tube 2.

The electronic means 20 comprises at least one electronic card 5 and at least one connector 6, here attached to the electronic card 5 and electrically connected to electrically conductive elements thereof. The electronic card 5 is for instance a data processing circuit, a meter or another device, connected to a control unit known per se and not shown. Here, the connectors 6 are flexible conductive lugs made of an electrically conductive material. One end of the connectors 6 is electrically connected to the electronic card 5 and one portion thereof rests against conductor tracks 3 of the tube 2, in such a way as to allow the exchange of signals between the electronic card 5 and the conductor track 3 of the tube 2 to other electronic means 20. It should be noted that the end of one connector 6 opposite the end in contact with the electronic card 5 is bent. It should also be noted that each connector 6 is arranged in such a way as to be able to slide along the conductor track 3 against which it is applied. This makes it possible to facilitate the connection and the disconnection of the tube 2. Besides, such mounting limits the risk of the electric bond breaking in case of unexpected motions of the tube 2.

The signals transiting through the conductor tracks 3 may be data signals or power signals. The data signals contain for instance one instruction for controlling an actuator or information from the sensors, the state of which has to be transmitted to control means, such as a programmable logic controller. Generally speaking, various types of signals may transit via the track 3 to any kind of electronic unit, power signals as well.

Figure 2:
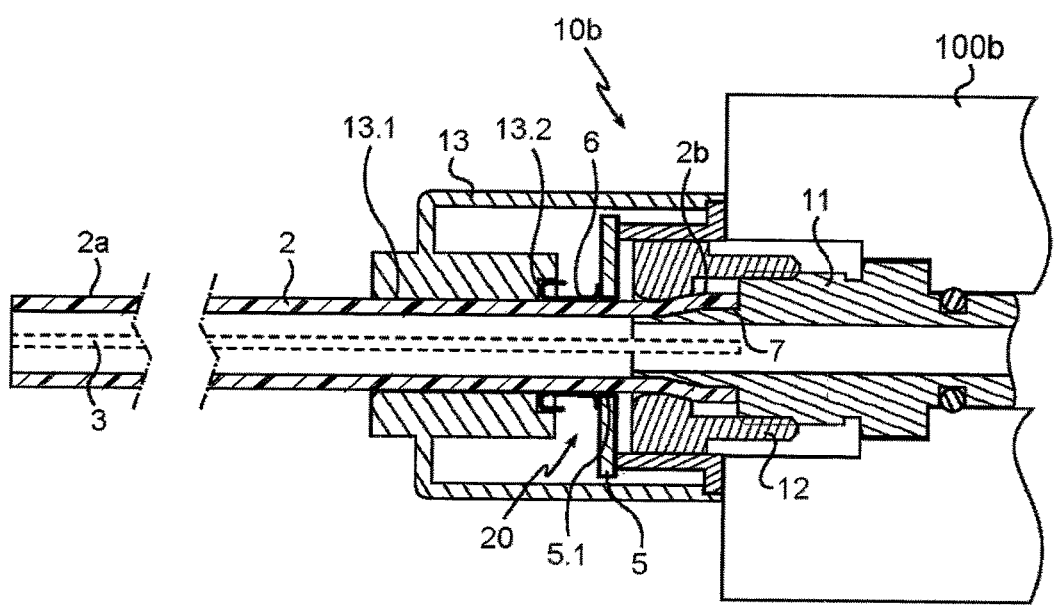
FIG. 2 is a sectional view of the tube according to the invention, one end of which is mounted in a coupling and engaging the electronics associated thereto.

According to a not restrictive embodiment of the invention, specifically visible in FIG. 2, one of the electronic means 20, including the electronic card 5 and the connectors 6, is positioned inside at least one coupling 10a, 10b in such a way as to reduce the overall dimensions. Besides, the casing 13 advantageously protects said electronic means 20 and specifically the electric connection thereof with the conductor track 3. Still advantageously, the casing 13 includes at least one housing 13.2 suitable for receiving at least one connector 6 and radially and/or axially locking same in order to avoid any defective contact between the connector 6 and a conductor track 3, and/or between the connector 6 and the electronic means 20.

The electronic card 5 here includes a hole 5.1 wherein the tube 2 which thus goes through the electronic card 5 extends. The connectors 6 are positioned on the periphery of the hole 5.1 still in such a way as to engage with at least one conductor track 3 of the tube 2. The bent shape of the ends of the connectors 6 is particularly adapted here since, as they are positioned on the periphery, the connectors form a flared passage, the maximum diameter of which is greater than the external diameter of the tube 2. The insertion of said tube 2 into the hole 5.1 of the electronic card 5 is thus facilitated.

Preferably here, several connectors 6 are positioned on the periphery of the hole 5.1 of the electronic card 5 and each one engages with one of the conductor tracks 3, with each connection between one connector 6 and one track 3 exchanging a different signal.

Figure 3:
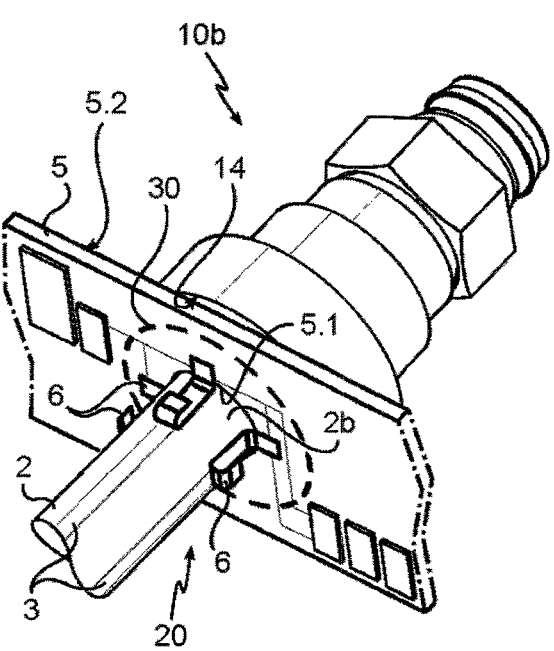
FIG. 3 is a perspective view of the tube according to the invention mounted in a coupling and having a specific arrangement in the connectors of a printed circuit engaging with the conductor tracks of the tube.

Such position on the periphery of the connectors is also shown in FIG. 3, which also illustrates another specific, not restrictive, embodiment, wherein the electronic means 20 is attached outside at least one coupling 10a, 10b by assembling means 30 which may, for instance, be an adhesive applied between a first contact surface 5.2 of the electronic means 20 and a second contact surface 14 of the associated coupling 10a, 10b. It should be taken for granted that any kind of mechanical assembling (whether permanent, dismountable, direct and indirect) is possible for assembling the electronic means 20 outside a coupling 10a, 10b.

Figure 4:
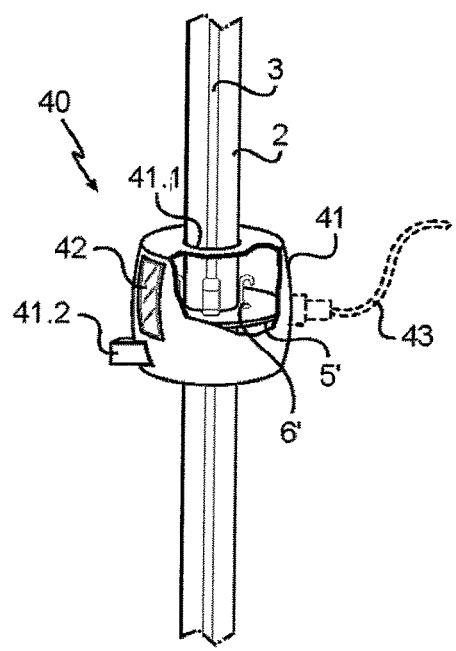
FIG. 4 is a perspective cut-away view of secondary electronic means in the form of a ring movable along the tube and provided with a visual indicator.

Still according to a not restrictive specific embodiment, specifically shown in FIG. 4, the fluid circulation device 1 further comprises secondary electronic means 40 of a type different from the previous ones and independent of the couplings 10a, 10b. The secondary electronic means is arranged in such a way as to be adjustable in position along the tube 2.

Here, the secondary electronic means 40 includes a ring 41 which itself includes a hole 41.1 so arranged as to slidingly receive the tube 2. The ring 41 also includes at least one connector 6' substantially similar to the connectors 6 described above and arranged in such a way as to engage with at least one conductor track 3 of the tube 2, an electronic card 5' for processing the signals transiting via one or more conductor track(s) 3 and one indicator 42 engaging with the electronic card 5' and arranged in such a way as to deliver sound or visual information characteristic of the presence of at least one electric signal transiting via one or more conductor track(s) 3. The ring 41 further comprises a locking device 41.2 making it possible to lock the position of the ring 41 along the tube 2. Such locking device 41.2 is here a tightening device actuated by a push button (partially shown). Such tightening device comprises a loop including a hole arranged in such a way as to slidingly receive the tube 2. The loop is mounted in the ring 41 so as to be radially movable between a loosening position wherein the loop and the ring 41 are coaxial and allow the sliding of the ring on the tube 2, and a tightening position wherein the loop and the ring 41 are axially offset and encompass the tube 2. The loop is elastically returned to the tightening position. In an alternative solution, the tightening means may include a screw radially engaged in the ring 41 to rest against the outer surface of the tube.

Among others, a state indicator can thus be obtained using such mobile secondary electronic means 40, with the latter specifically making it possible to deliver simple information, such as a lit warning light or a sound signal, for instance indicating the presence or the absence of current circulating in the conductor tracks.

Generally speaking, one of the electronic means 20/40 may be used as a relay by transiting signals and/or information resulting from the processing of the signals to other electronic units (not shown), for instance through a wire 43 or wireless connection (not shown). One of the electronic means thus may also be used as an antenna.

The device 1 thus makes it possible to create a smart fluid circulation network, whether hydraulic or pneumatic, able to read and transfer information and power to various points of said network, directly through the fluid circulation tubes.

The invention is not limited to the above, but on the contrary encompasses any alternative solution within the scope defined by the following claims.

More specifically, the electronic means may comprise any sensor, measuring device, or control device for the so-called «operative»portion of an automatic system. This means any type of actuator or pre-actuator which may be controlled by a programmable logic controller.

Besides, the position of the electronic means along the tube may vary according to the requirements and absolutely does not depend on the position of the couplings.

The number, shape and position of the tracks and of the dedicated connectors may also vary.

Said connectors do not however have to be movable and may simply be conductive weldings.

Of course, the material of the tube as well as the shape, diameter or thickness of the section thereof may vary while remaining within the scope of the invention.

In an alternative solution, the conductor track consists of a conductive metal strip added to said outer surface of the tube, for instance glued along the tube.

The tube may also include a protection for the conductor tracks such as a layer of varnish or an insulated sheath, whether armoured or not, against mechanical, chemical, electromagnetic incidents or short-circuits.

The couplings may also vary according to the utilization of the device according to the invention. As a matter of fact, so-called quick couplings, with a reducing hose coupler or a nozzle may also be suitable for providing the connection and tightness between one end of the tube and the associated fluid circulation unit.

The ring locking device may also have different shapes and any kind of locking system providing the desired stopping and releasing functions lies within the scope of the invention.

The device may also comprise primary electronic means at one single end of the conductor tracks and secondary electronic means at one point thereof.

The invention claimed is:

1. A fluid circulation device comprising at least one fluid circulation tube, a first coupling sealingly coupled to a first end of the tube and a second coupling sealingly coupled to a second end of the tube in such a way as to allow the circulation of fluid between said two couplings via the tube, wherein the device further comprises separate electronic means, and the tube is provided with at least one conductor track extending along an outer surface of the tube, with said track being suitable for transmitting at least one signal and arranged in such a way as to engage with the abovementioned electronic means, said device including at least one secondary electronic means which is independent of the couplings and which includes at least one electronic card and a connector engaging with the electronic card and the conductor track of the fluid circulation tube in such a way as to allow the transmission of a signal between the electronic card and the conductor track via the connector, wherein the electronic card includes a hole arranged in such a way that the fluid circulation tube goes through the electronic card.

2. The fluid circulation device according to claim 1, wherein the conductor track is a conductive metal strip added on the outer surface of the tube.

3. The fluid circulation device according to claim 1, wherein the conductor track is a printed conductive ink strip.

4. The fluid circulation device according to claim 1, wherein at least one of the electronic means includes at least one electronic card and one connector engaging with the electronic card and the conductor track of the fluid circulation tube in such a way as to allow the transmission of a signal between the electronic card and the conductor track via the connector.

5. The fluid circulation device according to claim 1, wherein at least one of the two couplings includes a primary electronic means.

6. The fluid circulation device according to claim 5, wherein at least one of the electronic means is attached outside the coupling.

7. The fluid circulation device according to claim 5, wherein at least one of the electronic means is received in a coupling housing.

8. The fluid circulation device according to claim 1, including at least one secondary electronic means independent of the couplings.

9. The fluid circulation device according to claim 8, wherein the electronic means independent of the couplings is movable along the tube.

10. The fluid circulation device according to claim 8, wherein the electronic means independent of the couplings includes at least one electronic card and a connector engaging with the electronic card and the conductor track of the fluid circulation tube in such a way as to allow the transmission of a signal between the electronic card and the conductor track via the connector.

11. The fluid circulation device according to claim 8, wherein the electronic means independent of the couplings includes at least one indicator arranged in such a way as to deliver sound and/or visual information characteristic of a signal transmitted via a conductor track.

12. The fluid circulation device according to claim 1, wherein at least one connector is positioned at the periphery of the hole in order to electrically connect the electronic card and the conductor track of the fluid circulation tube.

13. The fluid circulation device according to claim 1, wherein a protection is added on the outer surface of the tube to protect the conductor tracks.

14. A fluid circulation device comprising at least one fluid circulation tube, a first coupling sealingly coupled to a first end of the tube and a second coupling sealingly coupled to a second end of the tube in such a way as to allow the circulation of fluid between said two couplings via the tube, wherein the device further comprises separate electronic means, and the tube is provided with at least one conductor track extending along an outer surface of the tube, with said track being suitable for transmitting at least one signal and arranged in such a way as to engage with the abovementioned electronic means, said device including at least one secondary electronic means which is independent of the couplings and which includes at least one electronic card and a connector engaging with the electronic card and the conductor track of the fluid circulation tube in such a way as to allow the transmission of a signal between the electronic card and the conductor track via the connector, wherein the connector, is a flexible conductive lug arranged in such a way as to be able to slide along a conductor track.

15. The fluid circulation device according to claim 14, wherein the conductor track is a conductive metal strip added on the outer surface of the tube.

16. The fluid circulation device according to claim 14, wherein the conductor track is a printed conductive ink strip.

17. The fluid circulation device according to claim 14, wherein at least one of the electronic means includes at least one electronic card and one connector engaging with the electronic card and the conductor track of the fluid circulation tube in such a way as to allow the transmission of a signal between the electronic card and the conductor track via the connector.

18. The fluid circulation device according to claim 14, wherein at least one of the two couplings includes a primary electronic means.

19. The fluid circulation device according to claim 18, wherein at least one of the electronic means is attached outside the coupling.

20. The fluid circulation device according to claim 18, wherein at least one of the electronic means is received in a coupling housing.

21. The fluid circulation device according to claim 14, including at least one secondary electronic means independent of the couplings.

22. The fluid circulation device according to claim 21, wherein the electronic means independent of the couplings is movable along the tube.

23. The fluid circulation device according to claim 21, wherein the electronic means independent of the couplings includes at least one electronic card and a connector engaging with the electronic card and the conductor track of the fluid circulation tube in such a way as to allow the transmission of a signal between the electronic card and the conductor track via the connector.

24. The fluid circulation device according to claim 21, wherein the electronic means independent of the couplings includes at least one indicator arranged in such a way as to deliver sound and/or visual information characteristic of a signal transmitted via a conductor track.

25. The fluid circulation device according to claim 14, wherein at least one connector is positioned at the periphery of the hole in order to electrically connect the electronic card and the conductor track of the fluid circulation tube.

26. The fluid circulation device according to claim 14, wherein a protection is added on the outer surface of the tube to protect the conductor tracks.

\* \* \* \* \*